United States Patent [19]

Baylink

[11] Patent Number: 4,768,303
[45] Date of Patent: Sep. 6, 1988

[54] CONNECTOR APPARATUS

[76] Inventor: Carroll J. Baylink, P.O. Box 144, John Day, Oreg. 97845

[21] Appl. No.: 9,840

[22] Filed: Feb. 2, 1987

[51] Int. Cl.⁴ .......................................... A01K 87/02
[52] U.S. Cl. .................................................. 43/18.1
[58] Field of Search ...................... 403/61, 100, 102; 43/18.1

[56] References Cited

U.S. PATENT DOCUMENTS

| | | | |
|---|---|---|---|
| 1,039,986 | 10/1912 | Merritt | 403/61 |
| 1,041,147 | 10/1912 | Murphy | 403/61 |
| 1,906,218 | 4/1933 | Patchell | 403/100 |
| 2,895,757 | 7/1959 | Kaspar | 403/100 |
| 3,319,910 | 5/1967 | Collin et al. | 43/18.1 |
| 4,527,579 | 7/1985 | Knotter et al. | 403/100 |
| 4,611,945 | 9/1986 | Diego | 403/102 |

Primary Examiner—M. Jordan
Attorney, Agent, or Firm—Richard J. Polley

[57] ABSTRACT

A connector to a fishing rod object in side-by-side alignment is disclosed. The connector includes a channel to receive fishing line and/or leader so that the segments can be held side-by-side, for storage or transportation, without removing tackle and reeling in all the line.

14 Claims, 1 Drawing Sheet

U.S. Patent  Sep. 6, 1988  4,768,303
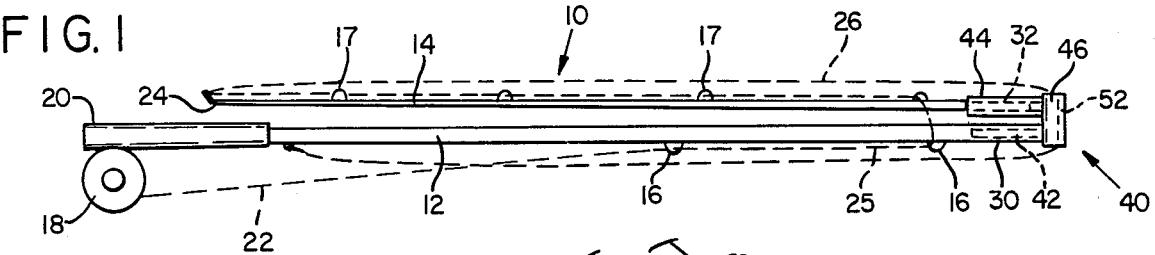
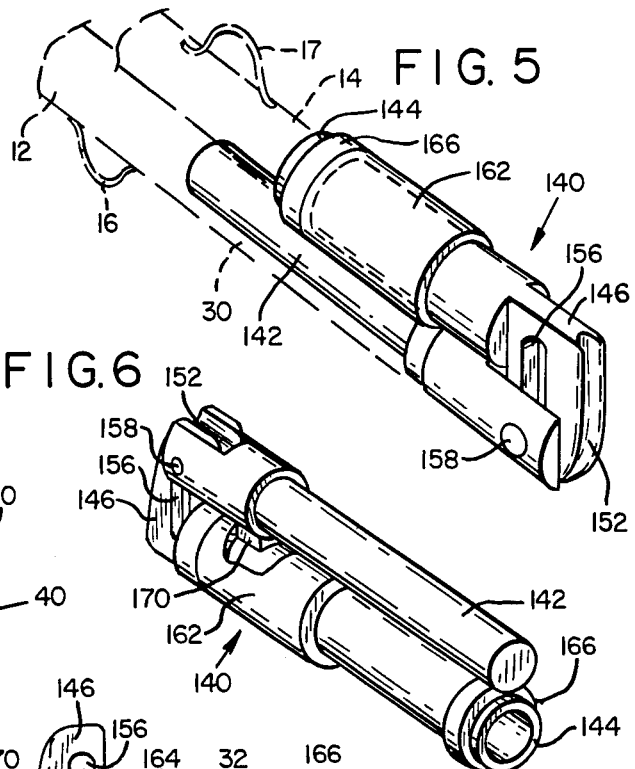
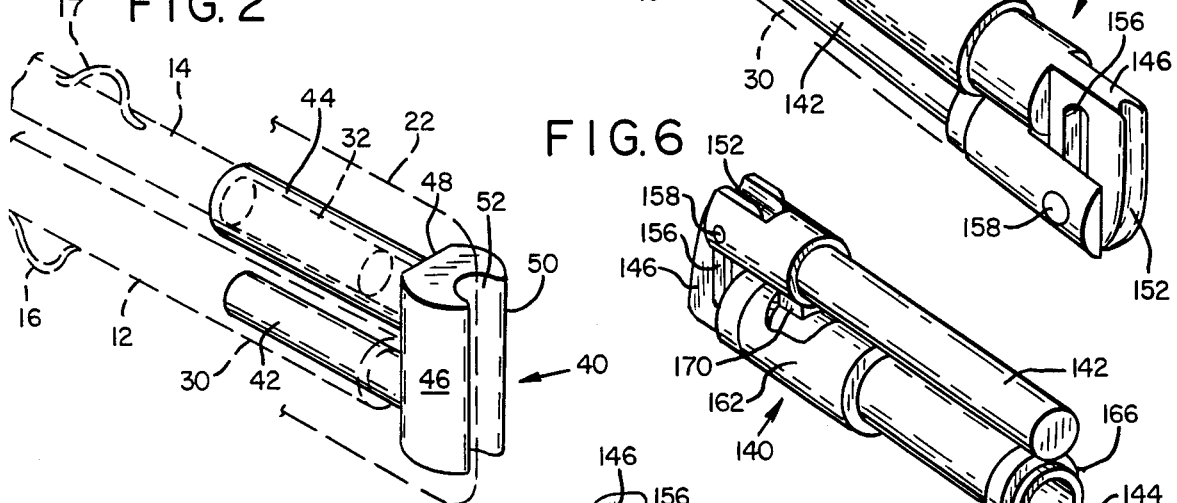
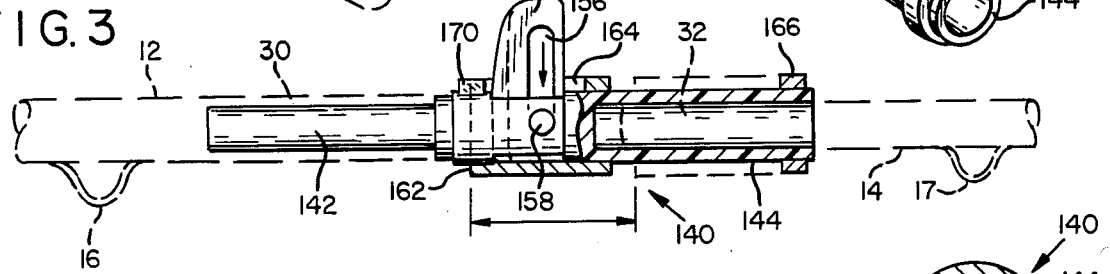
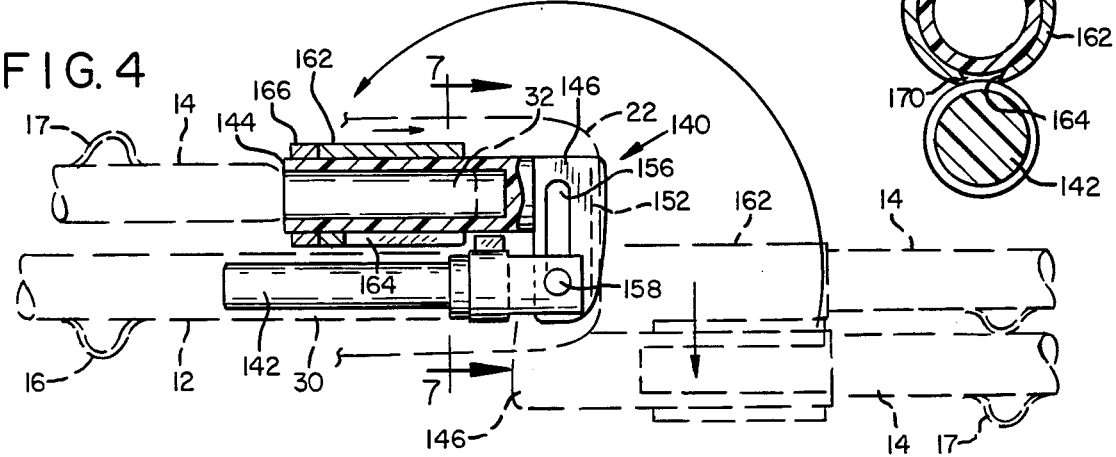

2

CONNECTOR APPARATUS

BRIEF SUMMARY OF THE INVENTION

This invention relates to to devices for securing together elongated objects, particularly the segments of a fishing pole, and to fishing poles which employ such devices.

Fishing poles of any length are usually made in two or more segments joined by ferrules. When a pole is not in use, the segments can be separated so that the pole can be more conveniently stored or transported.

When the pole is in use, fishing line extends through line guides on the pole segments. Fishing tackle, including a hook and other equipment, such as swivels, leaders, lures and bait are attached to the free end of the line. Before a pole can be broken down for storage, it is necessary to disconnect such tackle, which would otherwise become entangled in the separated pole segments. Once the tackle is removed, the line is fully reeled in, likewise to avoid tangling.

Because it takes considerable time to rig a fishing pole, i.e. to thread the fishing line through the line guides and attach tackle at the free end, it is very inconvenient to separate the pole segments if the user intends to carry the pole only a short distance, or store it for a short period of time. There is thus a need for a way to separate the segments for convenience of transportation and storage without derigging the pole.

The present invention is a connector device which allows the pole segments to be stored alongside one another in generally parallel alignment without derigging the pole. The connector is used to hold the pole segments in a fixed, side-by-side relationship. Additionally, the connector is adapted to hold fishing line or leader which may extend outwardly from the tip of the pole.

It is an object of the present invention to provide a connector which allows fishing pole segments to be conveniently stored side-by-side without derigging.

Another object is to provide a fishing pole with at least one such connector.

An additional object is to provide such a connector which is simple to use and easy to manufacture.

One specific object is to provide a hinge connector for joining two elongated objects, such as fishing pole segments.

Other objects and advantages of this invention will become apparent to those skilled in the art upon reading the following description.

BRIEF DESCRIPTION OF THE DRAWINGS

In the drawings:

FIG. 1 is a side elevational view of a fully rigged fishing pole that comprises two segments held in side-by-side relationship by a first connector according to the present invention;

FIG. 2 is an enlarged, isometric view of the connector shown in FIG. 1;

FIG. 3 is a side elevational view of a second connector according to the present invention, a portion being broken away to show internal detail, the connector having arms positioned to hold fishing pole segments in end-to-end alignment and having a locking sleeve in a locked position;

FIG. 4 is a vertical sectional view of the connector of FIG. 3, showing one arm of the connector located in a lowered and rotated position to hold the pole segments in side-by-side alignment with the locking sleeve in an unlocked position.

FIG. 5 is a top isometric view of the second connector positioned as shown in FIG. 4, with the locking sleeve in an unlocked position;

FIG. 6 is a bottom isometric view of the second connector positioned as shown in FIG. 4, with a portion broken away to show internal detail and with the locking sleeve shown in a locked position; and FIG. 7 is a sectional view taken along line 7—7 of FIG. 4.

DETAILED DESCRIPTION

FIG. 1 shows a fishing apparatus 10, which is a pole comprising two pole segments 12, 14 on which are mounted line guides 16, 17 respectively. A fishing reel 18 is mounted near the butt end 20. Fish line 22 extends from the reel 18 through the line guides 16, 17, including the line guide at the tip 24 of the pole. An inner length 25 of the line extends from the reel 18 to the tip 24. An outer length 26 extends outwardly from the tip. Fishing tackle is attached to the distal end of the outer length 26.

During normal usage, the pole segments 12, 14 are joined by means of a ferrule. Specifically, at a connection end of the segment 12 is a female portion 30 of the ferrule which receives the male portion 32 located at a connection end of pole segment 14. The female portion 30 is slightly flared and the male portion 32 is tapered at the same angle to provide a tight frictional fit. Different poles and portions of poles will have ferrules of different diameters and taper angles, depending on the manufacturer and pole size.

When it is desired to move the pole for more than a short distance or to place it in a vehicle, the two ferrule portions are separated and the pole segments placed side-by-side for easier handling. In order to accomplish this task, without intolerable tangling of the fishing tackle, it is necessary to remove the tackle from the line 22 and reel the line in completely onto the reel 18.

By using a transport and storage connector according to the present invention, placing the segments in side-by-side relationship is a much easier process. In one embodiment, shown in FIGS. 1 and 2, a connector 40 comprises a male coupling 42 which is shaped to be received by the female portion 30 of the ferrule, and a female coupling 44 shaped to receive the male portion 32 of the ferrule. The couplings 42, 44 are spaced apart and both attached to an interconnecting member 46 in such an orientation that the couplings extend from a first side 48 of the body in substantially the same direction and in substantially parallel alignment. A second, opposite side 50 of the body 46 defines a channel 52 which is adapted to receive and hold the fish line 22 and/or leader taut when the ferrule portions 30, 32 are engaged by the respective couplings and the pole segments 12, 14 are positioned adjacent one another along their respective lengths, as shown in FIG. 1. The inner length 25 of the line 22 can, but need not, be placed in the channel 52, depending on the preference of the user.

To use the connector 40, one separates the ferrule portions 30, 32 and pushes them into engagement with the couplings 42, 44 respectively. The line guides 16 of the segment 12 and the line guides 17 of the segment 14 should extend away from each other as shown, so that the line 22 can extend directly through the channel 52.

Once the line 22 is in the channel 52, the user can wind the reel 18 to take up slack in the line 22.

A hinged embodiment of the connector, which need not be removed when the pole is in use, is shown in FIGS. 3-7. Features of the hinged connector that are common to features of the connector of FIGS. 1 and 2 bear the same reference numerals incremented by one hundred.

The hinged connector has two bodies which serve as couplings 142, 144. In the illustrated embodiment, the interior of the female coupling 144 is slightly flared and the exterior of the male coupling 142 is tapered to provide a tight frictional fit with mating ferrel segments of the pole. One of the bodies, the male coupling 142 in the illustrated embodiment, is pivotally connected to the interconnecting member 146. In particular, the interconnecting member 146 defines an elongated opening 156. A pivot pin 158 is received in the opening for slidable and pivotal movement as shown in FIG. 4. When the two pole sections 12, 14 are coupled to the connector 140, the pole sections can be moved between a generally end-to-end position as shown in FIG. 3 and a generally side-by-side position as shown in FIG. 4 by pivoting the male coupling 142. To assure that the line 22 will be properly held in the channel 152, the connector 140 should be oriented such that, when the segments are in the side-by-side position, the line guides 16 extend in the opposite direction from the line guides 17, as shown in FIG. 4.

An end locking mechanism is provided for rigidly securing the coupling means in end-to-end alignment as shown in FIG. 3. The end locking mechanism includes a slidable sleeve 162 for encircling portions of both couplings 142, 144 when aligned end-to-end. The exterior of the connector 140 is tapered and the interior of the sleeve 162 is flared such that when the sleeve is moved toward the interconnecting member 146, it frictionally engages the connector 140 and is thus retained in a locked position. The sleeve 162 defines a slot 164 for receiving a portion of the interconnecting member 146 when the sleeve engages both the couplings aligned end-to-end. A stop ring 166 is provided on the female coupling 144 to prevent the sleeve 162 from inadvertently sliding off the connector 140. The stop ring may be permanently secured, or merely press fit to allow for removal of the sleeve 162 when desired. If press fit, preferably both the exterior of the connector 140 is turned and the ring 166 is bored to provide tapers of 1.5 degrees.

A side locking mechanism is provided for rigidly securing the couplings 142, 144 in side-by-side alignment. In the embodiment of FIGS. 3-7, interlocking devices are provided on both the male coupling 142 and the sleeve 162. In particular, at least a portion of the slot 164 is tapered to form a dovetail groove, and a flared dovetail tongue 170 extends from the male coupling 142, as best seen in FIG. 7. When the pole segments 12, 14 lie side by side, as illustrated in FIG. 4, the couplings 142, 144 can be locked together simply by sliding the sleeve 162 to the position shown in FIG. 6, such that the dovetail tongue and groove engage one another.

Because the hinged connector 140 of FIGS. 3-7 need not be removed from the pole when fishing, the connector should be made from the same material as the pole to preserve the action of the pole. Such materials may include fiberglass, leaded glass, carbon fiber, graphite and plastic.

Operation of the hinged connector will be apparent from the foregoing description. To move a pole from the extended position shown in FIG. 3 to the folded position shown in FIG. 4, the procedure is simple. First, one slides the sleeve 162 away from the pivot point, i.e. to the right in FIG. 3, to the unlocked position, shown by broken lines, where it no longer surrounds both the axially aligned couplings 142, 144. Next, one pushes the female coupling 144 downwardly to the position shown by the lowest set of broken lines in FIG. 4 and then rotates the coupling 144 about the pivot pin 158 until the coupling 144 is in the position shown by solid lines in FIG. 4. Finally, the sleeve 162 is moved back toward the pivot to the position shown in FIG. 6 so that the dovetail tongue and groove are engaged. The procedure is reversed to unfold the pole segments.

When the pole segments are moved from the extended to the folded position, the user may place the fishing line and/or leader in the connector channel and then wind the reel 18 to take up any slack in the line 22. The distal end of the fishing line and any associated tackle are secured to the pole at any convenient position, usually by engaging a hook with a convenient attachment point on the pole. Depending on the length of the leader, the attachment point could be a line guide 16, 17 on either of the segments 12, 14, a special eyelet near the reel 18, a cork hand grip portion, or a part of the reel. In some circumstances, the leader will be sufficiently long that the leader or other tackle will extend from the tip 16 through the channel on the connector, with the hook secured to a portion of the pole segment 12, as illustrated in FIG. 1.

Having shown and described preferred embodiments of my invention, it will be apparent to those skilled in the art that changed and modifications may be made without departing from my invention in its broader aspects. For example, a fishing pole according to the present invention could include more than two segments. Such a pole could advantageously employ multiple connectors. Connectors according to the present invention could be used to join elongated objects other than fishing pole segments. The hinged embodiments of FIGS. 3-7 could have bodies that are permanently secured to the pole segments, or the bodies could be formed as integral parts of the pole segments.

I thus claim as my invention all such modifications as come within the true spirit and scope of the following claims:

1. A transport and storage connector for a fishing apparatus that comprises a fish line and at least two pole segments with mating connection ends arranged such that, when the apparatus is in its operative state, the segments are connected end-to-end to provide a pole and the fish line extends continuously along the segments, the connector comprising:

first coupling means for engaging a connection end of a first pole segment;

second coupling means for engaging the mating connection end of a second pole segment, the first and second coupling means being connected in such a fashion that, when the respective connection ends are engaged by the respective coupling means, the first and second pole segments can extend substantially parallel to and alongside one another; and fish line receiving means for receiving and holding a fish line taut when the segments lie alongside one another.

2. The connector of claim 1 wherein:

the first and second coupling means are spaced apart;

an interconnecting means connects the first and second coupling means such that both the first and second coupling means can extend from a first side of the interconnecting means in substantially the same direction and in substantially parallel alignment; and the fish line receiving means comprises a channel which extends into and along the interconnecting means from a second side opposite the first side.

3. The connector of claim 2 wherein at least one of the coupling means is pivotally connected to the interconnecting means such that the first and second coupling means can be moved between a generally end-to-end position and a generally side-by-side position by rotating the pivotally connected coupling means.

4. The connector of claim 3 wherein:

the interconnecting means defines an elongated opening; and at least one of the coupling means is pivotally connected to the interconnecting means by a pivot pin received in the opening for slidable and pivotal movement within the opening.

5. The connector of claim 3 further comprising end locking means for rigidly securing the first and second coupling means in end-to-end alignment.

6. The connector of claim 5 wherein the end locking means comprises a slidable sleeve for encircling portions of both the first and second coupling means when in end-to-end alignment.

7. The connector of claim 6 wherein:

the slidable sleeve defines a slot for receiving a portion of the interconnecting means when the first and second coupling means are rigidly secured end-to-end; and a stop means is positioned to prevent the sleeve from inadvertently sliding off the connector.

8. The connector of claim 3 further comprising side locking means for rigidly securing the first and second coupling means in side-by-side alignment.

9. The connector of claim 8 wherein the side locking means comprises:

a slidable sleeve encircling a portion of one of the coupling means, the sleeve bearing a first interlock device; and a second interlock device located on the other of the coupling means, the interlock devices being arranged such that when the first and second coupling means are in side-by-side alignment, the sleeve can be moved axially to cause the first and second interlock devices to engage.

10. The connector of claim 9 wherein:

one of the interlock devices is a dovetail tongue; and
the other of the interlock devices is a dovetail groove.

11. The connector of claim 3 wherein the coupling means are immovably connected to the interconnecting means.

12. A transport and storage connector for a fishing pole apparatus that comprises a fish line and at least two pole segments which connect by means of a ferrule having male and female portions arranged such that, when the apparatus is in its operative state, the male and female portions are connected to provide a pole and the fish line extends continuously along the segments, the connector comprising:

a male coupling to be received by the female portion of a fishing pole ferrule;

a female coupling for receiving the male portion of the ferrule;

interconnecting means for interconnecting said male and female couplings, such that the male and female couplings can extend from a first side of the interconnecting means in substantially the same direction and in substantially parallel alignment; and fish line receiving means for receiving and holding a fish line taut when the ferrule portions and the respective couplings are engaged in such a manner that the pole segments are positioned adjacent one another along their respective lengths.

13. A fishing apparatus comprising:

a fish line;

multiple pole segments with mating connection ends arranged such that, when the apparatus is in its operative state, the segments are connected end-to-end to provide a pole and the fish line extends continuously along the segments; and a storage and transport connector to connect a pair of mating connection ends of the pole segments, the connector comprising (a) first coupling means for receiving a connection end of a first pole segment, (b) second coupling means for receiving the mating connection end of a second pole segment, the first and second coupling means being connected in such a fashion that, when the first and second coupling means engage the respective connection ends, the first and second pole segments can extend substantially parallel to and alonside one another, and (c) fish line receiving means for receiving and holding the fish line taut when the segments lie alongside one another.

14. The fishing apparatus of claim 13 comprising:

more than two pole segments; and a separate storage and transport connector to connect each pair of mating connection ends of the pole segments.

* * * * *